United States Patent [19]
Snitzer et al.

[11] Patent Number: 5,379,149
[45] Date of Patent: Jan. 3, 1995

[54] GLASS COMPOSITIONS HAVING LOW ENERGY PHONON SPECTRA AND LIGHT SOURCES FABRICATED THEREFROM

[75] Inventors: Elias Snitzer; Kanxian Wei, both of Piscataway, N.J.

[73] Assignee: Kutger, The State University of New Jersey, New Brunswick, N.J.

[21] Appl. No.: 102,899

[22] Filed: Aug. 6, 1993

[51] Int. Cl.6 .............................................. H01S 3/17
[52] U.S. Cl. ................................ 359/341; 501/37; 501/40; 257/13; 359/343; 372/6; 372/40
[58] Field of Search ............... 501/40, 37; 252/301.65; 372/6, 40; 359/341, 343; 257/13

[56] References Cited

U.S. PATENT DOCUMENTS

| | | | |
|---|---|---|---|
| 4,962,995 | 10/1990 | Andrews et al. | 501/40 X |
| 5,032,315 | 7/1991 | Hayden et al. | 501/37 X |
| 5,244,846 | 9/1993 | Onishi et al. | 501/40 |

FOREIGN PATENT DOCUMENTS

| | | | |
|---|---|---|---|
| 4333029 | 11/1992 | Japan | 359/341 |
| 4358130 | 12/1992 | Japan | 359/341 |
| 4358131 | 12/1992 | Japan | 359/341 |
| 5013864 | 1/1993 | Japan | 372/40 |
| 5013865 | 1/1993 | Japan | 372/40 |
| 5063284 | 3/1993 | Japan | 372/40 |
| 5063285 | 3/1993 | Japan | 372/40 |

OTHER PUBLICATIONS

"Systeme GeS$_2$–Ga$_2$S$_3$ Diagramme de Phases Ohtention et Properties des Verres" by A. M. Looireau-Lozac'h et al., *Ann. Chim*, 10 (1975) 101–104 (No Month).
"Study on Ge–Ga–X (X=S,Se) Glass Systems" by M. Xilai et al., *Proc. 14th Int. Congr. on Glass*, Natl, Ind. Cer. Soc., Calcutta, 1986, pp. 118–127 (No Month).

*Primary Examiner*—Mark L. Bell
*Assistant Examiner*—David Sample
*Attorney, Agent, or Firm*—Michael B. Einschlag

[57] ABSTRACT

Embodiments of the present invention are sulfur rich glass compositions comprising germanium, gallium and sulfur, which glass compositions have a low energy phonon spectrum and which glass compositions serve as a host for active materials in fabricating light sources such as fiber laser oscillators, light amplifiers, and superluminescent sources. In particular, such a laser oscillator, light amplifier or superluminescent source is comprised of an inventive glass composition which is doped with rare earth ions such as $Pr^{3+}$ or $Dy^{3+}$ for producing light output at wavelengths, among others, substantially at 1.3 um. Further embodiments of the present invention are light sources such as laser oscillators, light amplifiers and superluminescent sources which have emissions substantially at 1.3 um and which are comprised of an inventive glass composition which is doped with $Dy^{3+}$ and $Yb3+$ ions, wherein $Dy^{3+}$ ions are pumped by energy transfer from $Yb3+$ ions. Still further embodiments of the present invention are laser oscillators, light amplifiers and superluminescent sources emitting radiation in a wavelength region substantially at 1.3 um which comprise low phonon energy glasses or crystals doped with $Dy^{3+}$.

29 Claims, 4 Drawing Sheets

GLASS COMPOSITIONS HAVING LOW ENERGY PHONON SPECTRA AND LIGHT SOURCES FABRICATED THEREFROM

TECHNICAL FIELD OF THE INVENTION

The present invention pertains to glass compositions having a low energy phonon spectrum and light generating devices, such as fiber laser oscillators, light amplifiers, and superluminescent sources, which are fabricated by doping these glass compositions with active gain materials such as, for example, rare earth ions. In particular, the inventive glass compositions comprise sulfur rich compositions of germanium, gallium and sulfur. In further particular, laser oscillators, light amplifiers and superluminescent sources are fabricated by doping the inventive glass compositions with $Pr^{3+}$ or $Dy^{3+}$. In still further particular, laser oscillators, light amplifiers and superluminescent sources can be fabricated having emissions as far as, for example, 5 um, by utilizing dopants having transitions such as those associated with $Nd^{3+}$ from the 4I11/2 state to the 4I9/2 state. In yet still further particular, laser oscillators, light amplifiers and superluminescent sources can be fabricated having emissions substantially at 1.3 um by doping the inventive glass compositions with $Dy^{3+}$ and $Yb^{3+}$ ions, wherein $Dy^{3+}$ ions are pumped by energy transfer from $Yb^{3+}$ ions. Lastly, emission for laser oscillators, light amplifiers and superluminescent sources can be fabricated by doping the inventive glass compositions with Pr, Dy, Ho, Er, Nd or Tm for providing emission in the mid-infrared wavelength region of about 1.7 um to about 5 um.

BACKGROUND OF THE INVENTION

In the past few years, a great deal of work has been done to develop rare earth fiber amplifiers for use in optical communications systems. At present, the greatest success in this has been achieved with Er-doped silica fibers for use in amplifying 1.5 um optical signals. In fact, optical amplifiers based on Er-doped fibers are now available for long haul communications systems to replace electronic regenerators in which optical signals are converted to electrical signals before they are amplified. In contrast to this situation at 1.5 um, similar success has not been achieved in fabricating fiber amplifiers for use in amplifying 1.3 um optical signals which occur in the wavelength region at which most installed optical systems operate. At present, there are two main rare earth candidates for use in fabricating 1.3 um fiber amplifiers; neodymium and praseodymium.

Neodymium has a transition which produces fluorescence near 1.3 um between the 4F3/2 level and the 4I13/2 level. However, excited state absorption ("ESA") at about 1.3 um degrades amplifier performance. In particular, in a silica fiber host, 1.3 um ESA prohibits gains at wavelengths shorter than about 1.36 um. Although changing the host to ZBLAN glass causes a slight shift of the gain spectrum to shorter wavelengths, gains at 1.31 um are still low. In addition, the branching ratio for emission in Neodymium at 1.06 um and 0.9 um limits emission at 1.3 um to 10% since the more efficient emission at the shorter wavelength depletes the 3F3/2 level and, thereby, reduces amplification at 1.3 um.

A further problem occurs in fabricating fiber amplifiers for many laser transitions due to quenching by the host. Quenching occurs because of the presence of a level, below an upper laser level, which is relatively close in energy to the upper laser level. Unfortunately, this situation applies to a large number of potential laser transitions. As a result of this, i.e., the nature of optical transitions involved in producing light at a given wavelength, the selection of a glass host is crucial in fabricating fiber light amplifier devices.

In light of the above, a praseodymium doped fluoride fiber is currently viewed as the most promising candidate for fabricating a 1.3 um amplifier due to the absence of an absorbing transition competing with a laser transition between the 1G4 upper level and the 3H5 lower level in $Pr^{3+}$ in the desired wavelength region of 1.26 um–1.31 um. In fact, amplification has been demonstrated in Pr-doped fluorozirconate glass fibers at 1.31 um. Despite this, however, the selection of a host glass is still critical in this case because of the close proximity of lower lying levels to the 1G4 upper laser level. As one can see from the energy level diagram of $Pr^{3+}$ shown in FIG. 1, the energy gap between the 1G4 upper laser level and the 3F4 lower lying level manifold is approximately 3000 $cm^{-1}$. Further, it is known that non-radiative transitions from the 1G4 level to the 3F4 level manifold will be decreased in a host whose highest energy phonon has relatively small energy. For example, in a fused silica host, the highest energy phonon has an energy of approximately 1100 $cm^{-1}$. Since only three such phonons need be emitted to bridge the gap between the 1G4 level and the 3F4 level manifold, non-radiative transitions between these levels are very rapid. As a result, there is no measurable emission at 1.3 um. However, it has been demonstrated in the art that, in a heavy metal fluoride glass host, non-radiative transition probabilities are substantially reduced relative to those occurring in a fused silica host—the highest energy phonon for a heavy metal fluoride glass host is approximately 500 $cm^{-1}$. Thus, in a heavy metal fluoride glass host, approximately six phonons need to be emitted to bridge the gap between the 1G4 level and the 3F4 level manifold. Because of the larger number of phonons required for this non-radiative transition, the transition probability is less than that for a fused silica glass. The resulting difference in transition probability makes it possible to obtain laser radiation from the transition between the 1G4 level and the 3H5 level. Nevertheless, even with such an improvement associated with the use of a heavy metal fluoride host, the quantum efficiency for fluorescence for this case is still only 3%. This low quantum efficiency is evidenced by a relatively short fluorescent lifetime of approximately 0.1 ms for emission from the 1G4 level. In addition, a calculation from Judd-Ofelt Parameters gives a radiative lifetime from the 1G4 level of approximately 3 ms. This supports the conclusion of a quantum efficiency for fluorescence of only 3%.

In light of the above, there is a need for a glass composition having a low energy phonon spectrum which can serve as a host for active materials for use in fabricating light sources such as fiber laser oscillators, light amplifiers, and superluminescent sources. In particular, there is a need for such a glass composition which can be used to fabricate light sources wherein the active materials comprise rare earth materials. In further particular, there is a need for such a glass composition which can be utilized to fabricate light sources wherein the active materials comprise rare earth materials for producing radiation substantially at 1.3 um.

SUMMARY OF THE INVENTION

Embodiments of the present invention advantageously satisfy the above-identified need in the art and provide a glass composition having a low energy phonon spectrum which can serve as a host for active materials for use in fabricating light sources such as fiber laser oscillators, light amplifiers, and superluminescent sources. In particular, embodiments of the present invention are sulfur rich glass compositions comprising germanium, gallium and sulfur. In further particular, further embodiments of the present invention are light sources such as laser oscillators, light amplifiers and superluminescent sources comprised of the inventive glass composition which is doped with $Pr^{3+}$ or $Dy^{3+}$ for producing light output at wavelengths, among others, substantially at 1.3 um. In still further particular, further embodiments of the present invention are light sources such as laser oscillators, light amplifiers and superluminescent sources which are fabricated having emissions as far as, for example, 5 um, by utilizing dopants having transitions such as those associated with $Nd^{3+}$ from the 4I11/2 state to the 4I9/2 state. In still yet further particular, further embodiments of the present invention are light sources such as laser oscillators, light amplifiers and superluminescent sources having emissions substantially at 1.3 um comprised of the inventive glass composition which is doped with $Dy^{3+}$ and $Yb^{3+}$ ions, wherein $Dy^{3+}$ ions are pumped by energy transfer from $Yb^{3+}$ ions. Lastly, an embodiment of the present invention comprises doping $Dy^{3+}$ in any glass or crystalline host material having a low phonon energy spectrum so as to obtain efficient light amplification in a wavelength region substantially at 1.3 um.

The inventive glass compositions are advantageous for several reasons. First, they have a low energy phonon spectrum which promotes efficient laser transitions. Second, they are readily doped with substantial amounts of rare earth materials, for example, the inventive glass compositions can be doped with as much as a few mole % of rare earth materials such as, for example, praseodymium. Third, the inventive glass compositions are substantially transparent in the red and near infrared region of the spectrum so that they enable efficient pumping of active dopants with radiation such as 0.8 um radiation which is provided by readily available laser diodes.

BRIEF DESCRIPTION OF THE DRAWINGS

A complete understanding of the present invention may be gained by considering the following detailed description together with the accompanying drawings, in which.

DETAILED DESCRIPTION

Figure 1:
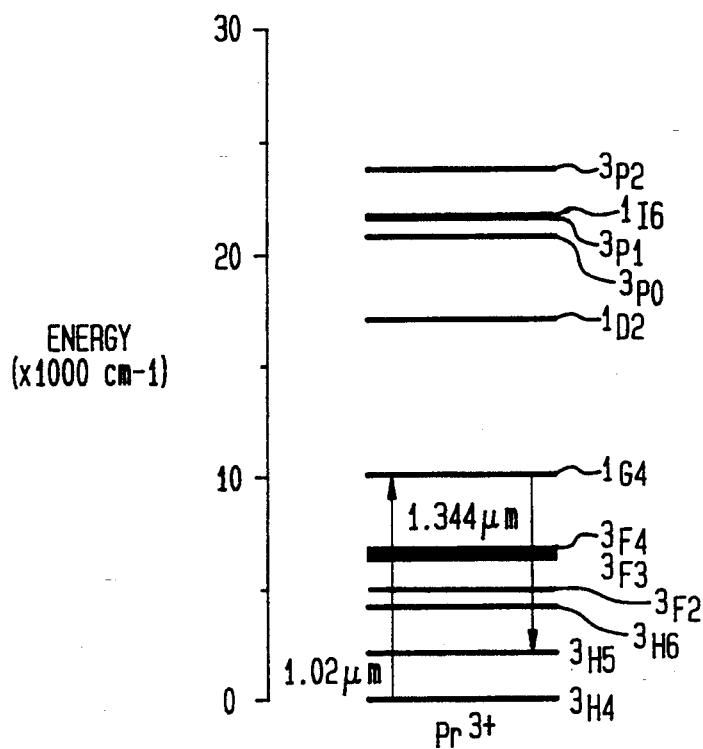
FIG. 1 shows an energy level diagram of $Pr^{3+}$.
Figure 2:
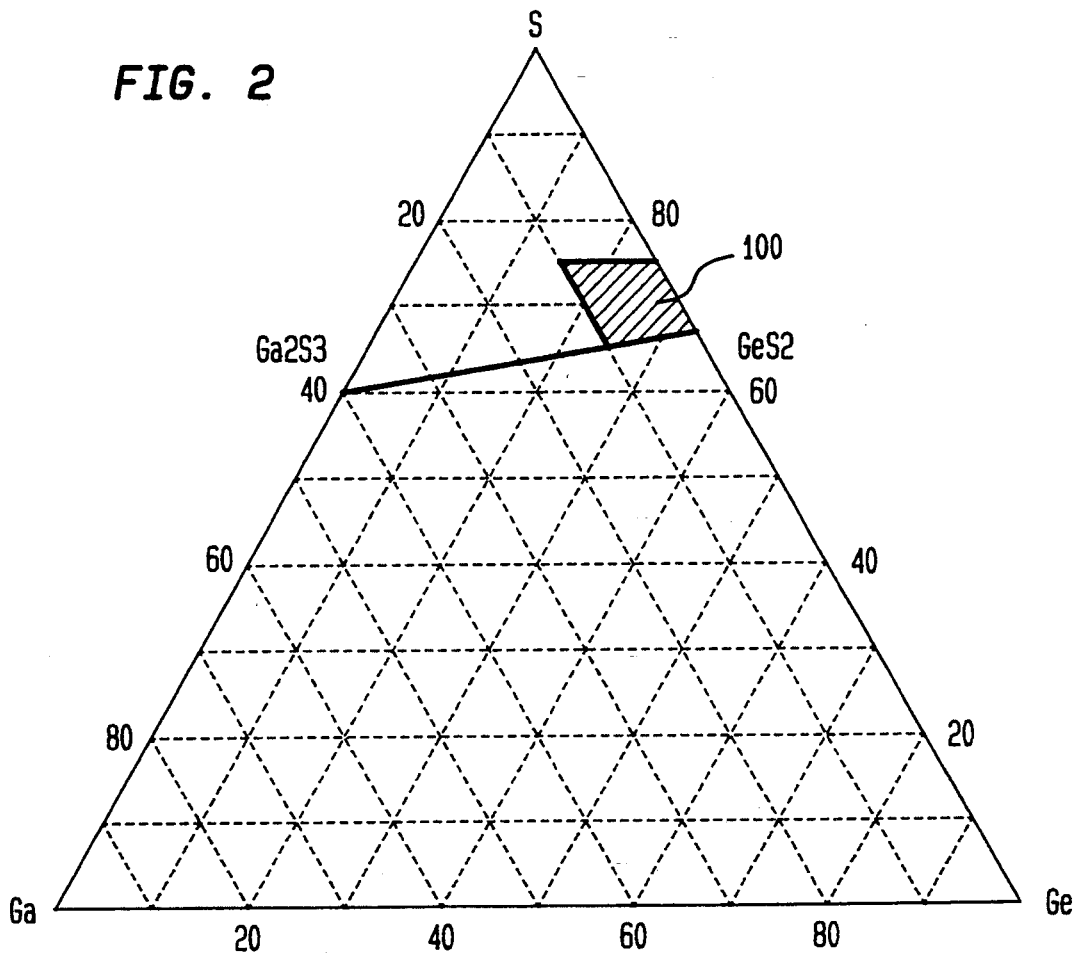
FIG. 2 shows a phase diagram of germanium, gallium, and sulfur glass compositions in which sulfur-rich, inventive-composition region 100 is shaded.

An embodiment of the present invention comprises a glass composition for use as a host material in fabricating fiber laser oscillators, light amplifiers, and superluminescent sources in which efficient operation requires a low energy phonon spectrum for the host material. The inventive glass composition comprises a sulfur rich composition of germanium, gallium, and sulfur. FIG. 2 shows a phase diagram for germanium, gallium, and sulfur in which sulfur-rich, inventive-composition region 100 is shaded. The center of region 100 is substantially at a composition of $Ge_{0.25}Ga_{0.05}S_{0.70}$ in mole fraction.

Embodiments of inventive light sources are fabricated by doping a host material comprised of the inventive glass composition with rare earth materials. The inventive glass compositions are advantageous for several reasons. First, they have a low energy phonon spectrum which promotes efficient laser transitions. Second, they are readily doped with substantial amounts of rare earth materials, for example, the inventive glass compositions can be doped with as much as a few mole % of rare earth materials such as, for example, praseodymium. Third, the inventive glass compositions are substantially transparent in the red and near infrared region of the spectrum so that they enable efficient pumping of active dopants with radiation such as 0.8 um radiation which is provided by readily available laser diodes.

On theoretical grounds, the radiative lifetime of a laser transition in a rare earth doped (for example, $Pr^{3+}$ doped), sulfur rich, Ge-Ga-S glass host is expected to have a value of approximately 1 ms. This occurs in accordance with the effect of a local field correction term in the Judd-Ofelt Parameters whereby transition probability depends on the index of refraction. In accordance with this, the relatively high index of refraction for the inventive sulfur rich Ge-Ga-S glass provides a relatively short radiative lifetime. The fluorescence of the 1G4→3H5 transition in $Pr^{3+}$ doped, sulfur rich, Ge-Ga-S fibers has been examined and it has been determined that the radiation lifetime thereof is approximately 0.35 ms. As a result, we have concluded that the quantum efficiency of the transition is at least 30% and probably even higher due to other factors in the Judd-Ofelt Parameters.

The fabrication of the inventive glass composition is carried out by means of any of the standard methods for making high quality glass which are well known in the art such as, for example, the use of a rocking furnace with sealed silica ampoules in which the glass is reacted and homogenized. Further, fibers are drawn by standard methods which are well known in the art and which require exclusion of oxygen or water vapor in hot zones of a fiber draw tower.

Glass formation in a GeS2-Ga2S3 system has been reported in an article by A. M. Looireau-Lozac'h et al. *Ann. Chim,* 10 (1975) 101 and glass formation in a Ge-Ga-S system has been reported in an article by M. Xilai, Z. Mingli. Y. Peihong and G. Fuxi, *Proc. 14th Int. Congr. on Glass*, vol. 1, Indian Ceramic Society, Calcutta, 1986, p. 1. However, there are significant differences between the inventive sulfur rich, Ge-Ga-S compositions in the region of Ge0.25Ga0.05S0.70 and the compositions disclosed in the above-referenced articles. In particular, and in contrast to the compositions disclosed in the articles, the inventive compositions have: (a) high solubility for rare earths; (b) good optical quality; and (c) substantial transparency in the red and near infrared region of the spectrum which is important for pump considerations.

Fibers were fabricated wherein praseodymium was added as a dopant to a host comprised of the inventive glass composition. The method of fabricating the glass host followed well established procedures wherein high purity (99.999% to 99.9999%) elemental materials were used as smarting materials and praseodymium was introduced into the host in its sulfide form. Typical batch sizes for these embodiments were 5-20 gms. The raw materials were loaded into a silica glass ampoule in a glove box filled with high purity argon gas. The ampoule was sealed off under vacuum with an oxy-propane flame and the melt was kept in a rocking furnace at 850°-950° C. for 20-30 hours. Glass samples of high optical quality were obtained by quenching the ampoule in air. Finally, all samples were annealed at a temperature 10° C. below their glass transition temperatures for four hours before they were cut and polished.

Fluorescence was measured on bulk samples using a computer driven system which comprised a Jarrell-Ash monochromator with a stepping motor, an EG&G Model 5209 lock-in amplifier, and a cryogenically cooled InSb detector. A Schwartz-Electro-Optics, Ti-sapphire tunable solid laser pumped with a Coherent System I-200 argon laser was used as a pump source. The pump wavelength for the $Pr^{3+}$ active material was 1.02 um and the fluorescent lifetimes were measured using a germanium detector and a Tektronix Model 7854 Oscilloscope.

Figure 3:
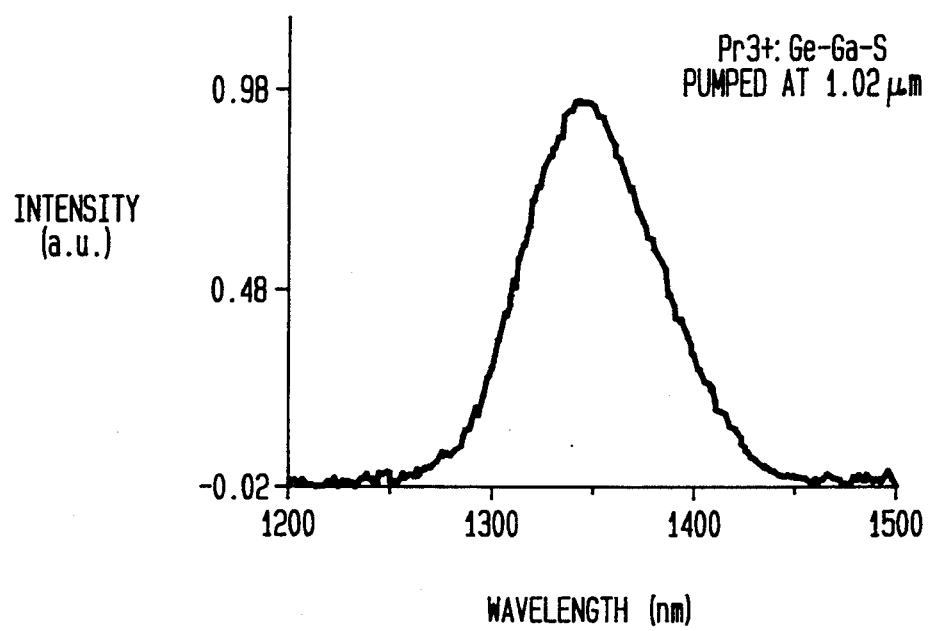
FIG. 3 shows an emission band of the 1G4→3H5 transition in $Pr^{3+}$ doped Ge-Ga-S glass when pumped at 1.02 um.

FIG. 3 shows the emission band of the 1G4→3H5 transition in the $Pr^{3+}$ doped Ge-Ga-S glass when pumped at 1.02 um. The peak wavelength of the fluorescence in the Ge-Ga-S glass host is 1.344 um. This is slightly shifted to longer wavelengths as compared with fluorescence of this transition for a $Pr^{3+}$ doped ZBLAN glass. As shown in FIG. 3, the spectral bandwidth of the transition is about 80 nm.

Figure 4:
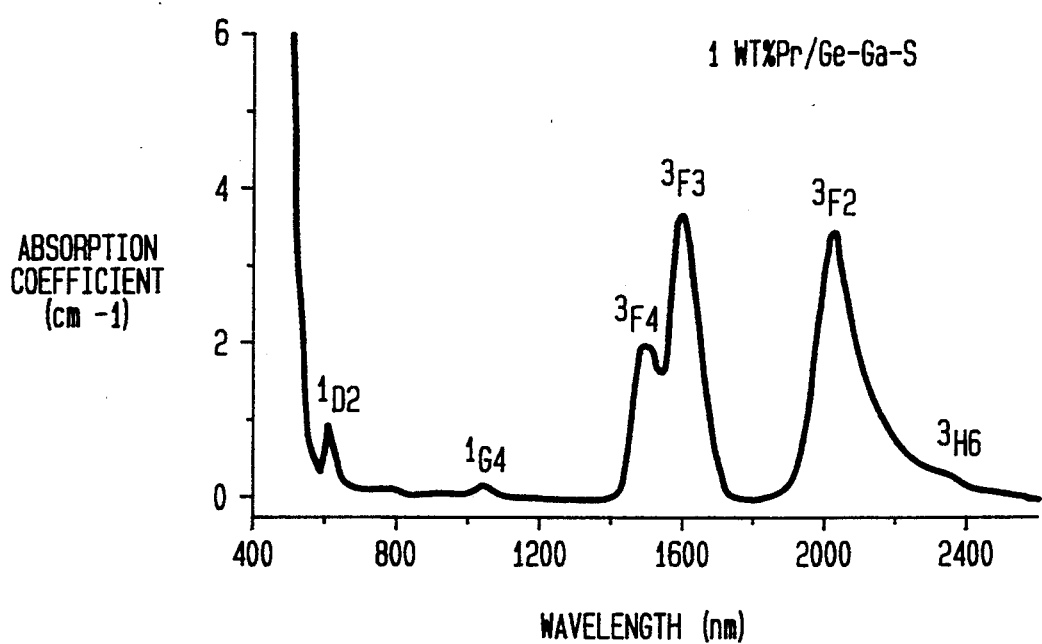
FIG. 4 shows an absorption spectrum of $Pr^{3+}$ doped Ge-Ga-S glass in the 400–2600 nm wavelength region.

In order to predict the performance of a $Pr^{3+}$: Ge-Ga-S based fiber amplifier, a Judd-Ofelt analysis was conducted using absorption measurement data. Absorption measurements were made on a sample having a high praseodymium concentration ($1.2 \times 10^{20}$ ions/cm$^3$). The optical absorption spectra were measured using a double beam Perkin-Elmer Lambda-9 spectrometer; strong absorptions were measured on 3 mm thick samples and weak transitions were measured on 1.2 cm thick cylindrical samples. The absorption spectrum of $Pr^{3+}$ in the 400-2600 nm region is shown in FIG. 4.

The radiative lifetime for $Pr^{3+}$ doped Ge-Ga-S glass was computed to be about 500 usec, this value being much shorter than the value of 3.2 msec which is obtained for $Pr^{3+}$ doped ZBLAN glass. The measured fluorescence lifetime for $Pr^{3+}$ doped Ge-Ga-S glass is longer than that for $Pr^{3+}$ doped ZBLAN glass due to a very low non-radiative relaxation rate in the $Pr^{3+}$ doped Ge-Ga-S glass. For example, for 500 ppm $Pr^{3+}$ doped Ge-Ga-S glass, the measured fluorescence lifetime was about 360 usec, which is more than three times longer than the 110 usec fluorescence lifetime of ZBLAN glass. As a result of this, the quantum efficiency, which is defined as the measured fluorescence lifetime divided by the radiative lifetime, increased substantially for the 1G4→3H5 transition in $Pr^{3+}$ doped Ge-Ga-S glass over that previously available in the art. In particular, the estimated value of quantum efficiency is about 72%.

As is known, the efficiency of a fiber amplifier is directly proportional to a product of the peak stimulated emission cross section and the lifetime of the excited state. Both of these parameters have been determined. The product of these parameters for $Pr^{3+}$ doped Ge-Ga-S glass is $4.79 \times 10^{-24}$ cm$^2$ sec whereas it is only $0.38 \times 10^{-24}$ cm$^2$sec for $Pr^{3+}$ doped ZBLAN glass. This makes $Pr^{3+}$ doped Ge-Ga-S glass an excellent material for use in fabricating 1.3 um signal amplifiers.

Another important factor affecting fiber amplifier performance is the concentration of rare earth ions in the glass host. Specifically, when the concentration of rare earth ions increases and the spacing between the rare earth ions decreases, fluorescence quenching occurs due to non-radiative energy transfer between the rare earth ions. Concentration quenching of the 1G4→3H5 transition in $Pr^{3+}$ doped Ge-Ga-S glass was studied by measuring fluorescence lifetimes of samples with $Pr^{3+}$ concentrations ranging from 100 ppm to 1 wt. %. The fluorescence lifetimes were determined by measuring the first e-folding time of the fluorescence decay curve. It was determined that: (a) at concentrations above 500 ppm of $Pr^{3+}$, the fluorescence lifetime decreased rapidly to about 107 usec at 1 wt. % of $Pr^{3+}$ and (b) at concentrations below 500 ppm, the lifetime started to level off. Thus, in fabricating fiber amplifiers in $Pr^{3+}$ doped Ge-Ga-S glass, the concentration of praseodymium should be less than 500 ppm by weight to suppress concentration quenching.

Figure 5:
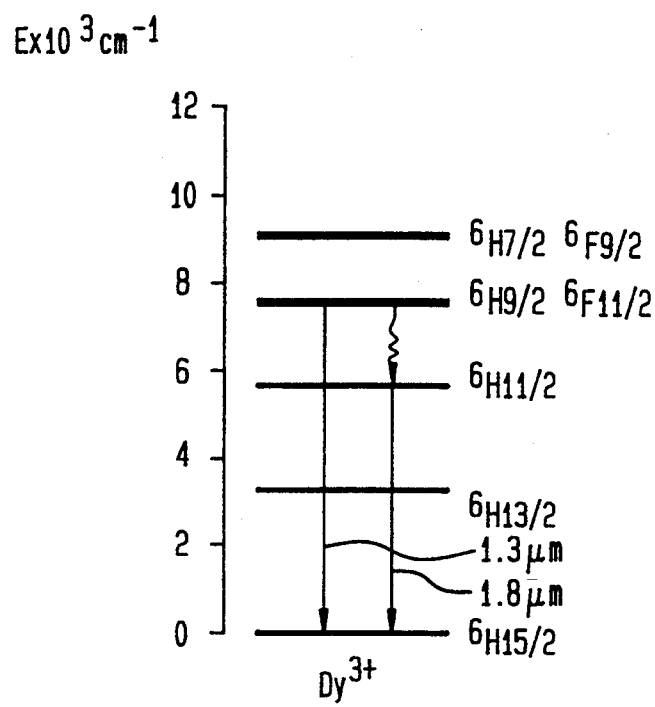
FIG. 5 shows an energy level diagram of $Dy^{3+}$.

In further embodiments of the present invention, an active doping material is dysprosium ($Dy^{3+}$). FIG. 5 shows an energy level diagram for $Dy^{3+}$. It has been discovered than fluorescence occurs at 1.3 um and 1.8 um following pumping with 0.8 um light. It is believed that the 1.3 um emission originates at an overlapped energy level (6H9/2, 6F11/2). Although the energy spacing between this overlapping energy level and the 6H11/2 energy level below it is only 2000 cm$^{-1}$, the transition from the (6H9/2, 6F11/2) to the 6H15/2 ground state is a hypersensitive transition gap whose radiative emission rate is fast enough to effectively compete with the non-radiative quenching transition to provide measurable emission at 1.3 um.

Figure 6:
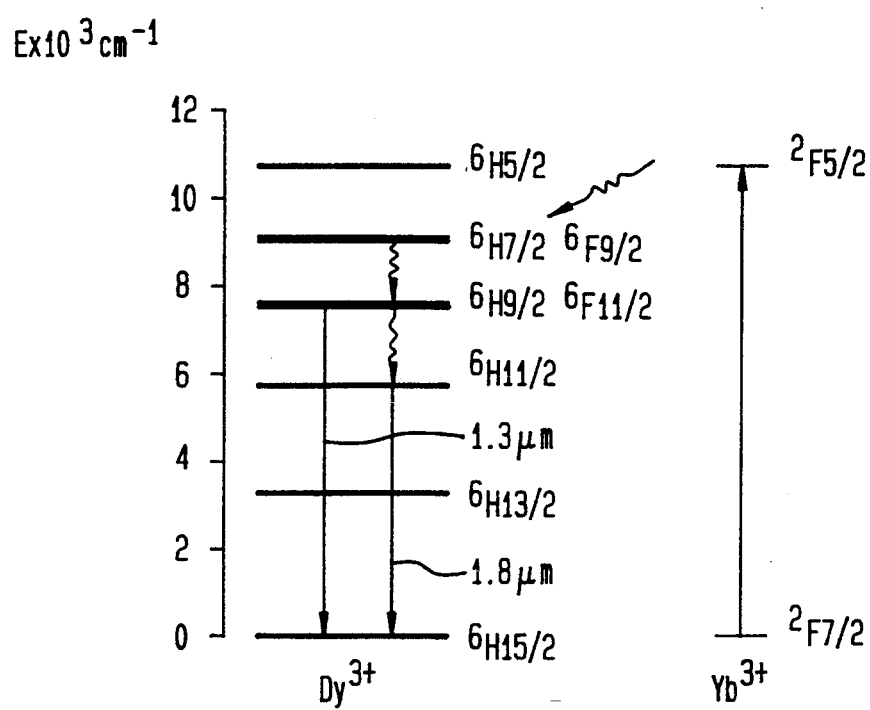
FIG. 6 shows an energy level diagram of $Yb^{3+}$ and $Dy^{3+}$.

In addition to the use of $Dy^{3+}$ doped Ge-Ga-S glass to fabricate a laser amplifier or oscillator at 1.3 um by direct pumping into any of the absorption bands of $Dy^{3+}$, one can also dope a Ge-Ga-S glass host with $Yb^{3+}$ and $Dy^{3+}$. In this material, pumping radiation is absorbed first by the $Yb^{3+}$ ions. These ions subsequently transfer energy from the 2F5/2 upper level of $Yb^{3+}$ to $Dy^{3+}$. Absorption by $Yb^{3+}$ followed by energy transfer into any level in $Dy^{3+}$ above the (6H9/2, 6F11/2) level will lead to rapid non-radiative decay to this level because of the close spacing of these levels. FIG. 6 shows an energy level diagram of $Yb^{3+}$ and $Dy^{3+}$. Energy transfer to $Dy^{3+}$ can also occur from Nd, Ho, Er, and Tm, as well as selected transition metals such as Cr and Mn. This makes all of these ions useful for co-doping with $Dy^{3+}$ in Ge-Ga-S glass to fabricate laser oscillators, light amplifiers, and superluminescent sources.

Figure 7:
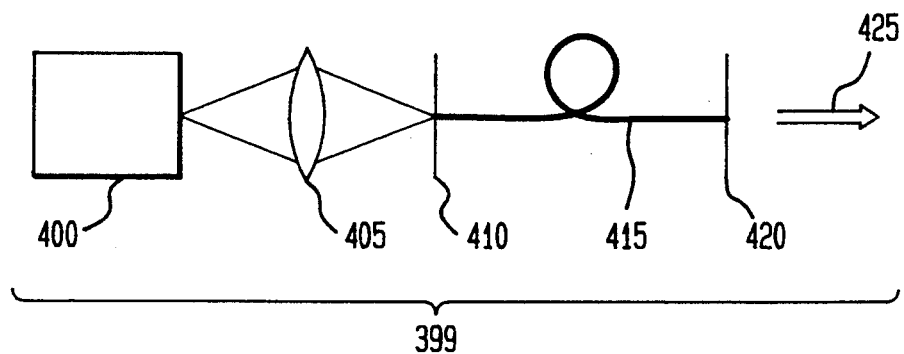
FIG. 7 shows a fiber laser oscillation device doped with $Pr^{3+}$ or $Dy^{3+}$ which has end mirrors affixed to the ends of the fiber and which is pumped with radiation suitable for the particular dopant.

FIG. 7 shows a typical fiber laser oscillation device 399 which emits laser light 425 having a wavelength substantially in a wavelength region around 1.3 um. As shown in FIG. 7, where rare earth doped fiber 415 is doped with $Dy^{3+}$, laser oscillation device 399 comprises: (a) pump light source 400 which produces pump radiation at wavelengths of about 0.8 um, about 0.9 um, or about 1.1 um (those of ordinary skill in the art understand the specific types of pump sources which can produce pump radiation at these various wavelengths such as, for example, laser diodes for pump radiation at wavelengths of about 0.8 um); (b) focusing lens 405; (c) entrance reflector 410 which is a high reflector for radiation having wavelengths substantially in a wavelength region substantially at 1.3 um and entrance reflector 410 is transparent, i.e., having a reflectivity of less than about 20% at the pump wavelength of about 0.8 um, about 0.9 um, or about 1.1 um; (c) $Dy^{3+}$ doped fiber 415; and (d) laser light exit reflector 420 (laser light exit reflector 420 is a high reflector at the pump wavelength of about 0.8 um, about 0.9 um, or about 1.1 um and has a reflectivity substantially in a range from about 70% to about 95% at about 1.3 um. For the embodiment shown in FIG. 7, where rare earth doped fiber 415 is doped with $Pr^{3+}$, (a) pump light source 400 produces pump radiation at wavelengths substantially equal to 1.02 um; (b) entrance reflector 410 is a high reflector for radiation having wavelengths substantially in a wavelength region substantially at 1.3 um and entrance reflector 410 is transparent, i.e., having a reflectivity of less than about 20% at the pump wavelength of about 1.02 um; (c) rare earth doped fiber 415 is doped with $Pr^{3+}$; and (d) laser light exit reflector 420 has a reflectivity substantially in a range from about 70% to about 95% at about 1.3 um (the reflectivity at the pump wavelength of about 1.02 um is not important if fiber 415 is long, however for short lengths, the reflectivity should be relatively high, i.e., greater than about 80%).

Figure 8:
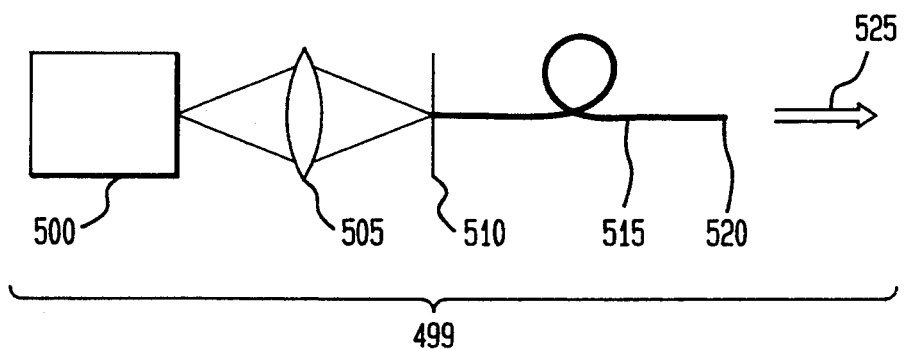
FIG. 8 shows a superluminescent device.

FIG. 8 shows a typical superluminescent device 499 which emits radiation 525 having a wavelength substantially in a wavelength region around 1.3 um. As shown in FIG. 8, where rare earth doped fiber 515 is doped with $Dy^{3+}$, superluminescent device 499 comprises: (a) pump light source 500 which produces pump radiation at wavelengths of about 0.8 um, about 0.9 um, or about 1.1 um; (b) focusing lens 505; (c) entrance reflector 510 (entrance reflector 510 is a high reflector for radiation having wavelengths substantially in a wavelength region substantially at 1.3 um and entrance reflector 510 is transparent, i.e., having a reflectivity of less than about 20% at the pump wavelength of about 0.8 um, about 0.9 um, or about 1.1 um; and (c) $Dy^{3+}$ doped fiber 515. Laser fiber end 520 has no end reflector and a beveled edge or oil or an anti-reflection coating to suppress reflection. For the embodiment shown in FIG. 8, where rare earth doped fiber 515 is doped with $Pr^{3+}$, (a) pump light source 500 produces pump radiation at wavelengths substantially equal to 1.02 um; (b) entrance reflector 510 is a high reflector for radiation having wavelengths substantially in a wavelength region substantially at 1.3 um and entrance reflector 510 is transparent, i.e., having a reflectivity of less than about 20% at the pump wavelength of about 1.02 um; and (c) rare earth doped fiber 515 is doped with $Pr^{3+}$.

Figure 9:
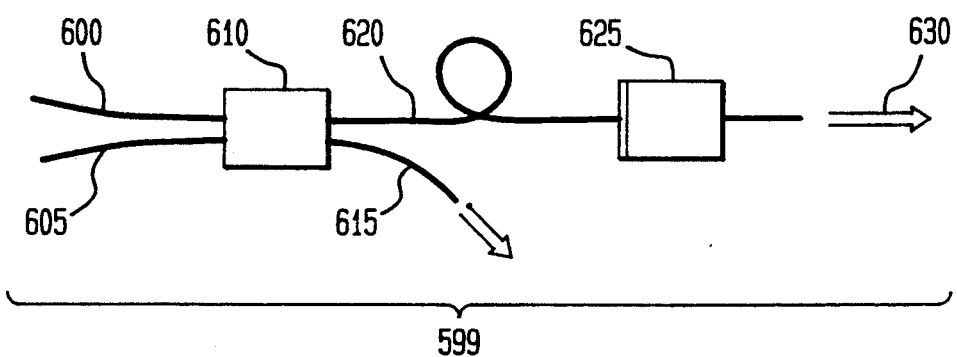
FIG. 9 shows a light amplifier for 1.3 um radiation which comprises a rare earth doped fiber in conjunction with: (a) a coupler for use in feeding pump light and signal light into the fiber and (b) an optical isolator to prevent back reflection of amplified light.

FIG. 9 shows a light amplifier 599 for producing amplified 1.3 um radiation 630. As shown in FIG. 9, where rare earth doped fiber 620 is doped with $Dy^{3+}$, light amplifier 599 comprises: (a) dispersive coupler 610 which combines pump radiation at wavelengths of about 0.8 um, about 0.9 um, or about 1.1 um from fiber 605 with 1.3 um radiation from fiber 600 (as shown in FIG. 9, coupler 610 combines and couples approximately 90% of the radiation in fibers 600 and 605 into fiber 620 and coupler 610 combines and couples approximately 10% of the radiation in fibers 600 and 605 into fiber 615 for monitoring purposes); (b) $Dy^{3+}$ doped light amplifier fiber 620; and (c) Faraday isolator 625 to prevent back reflection. For the embodiment shown in FIG. 9, where rare earth doped fiber 620 is doped with $Pr^{3+}$, pump radiation in fiber 605 is comprised of wavelengths substantially equal to 1.02 um.

In addition to the above, the inventive sulfur rich Ge-Ga-S glass compositions are more favorable for rare earth doping for its lower energy phonon spectrum as further compared, for example, with heavy metal fluoride glass compositions. Also, the longer measured fluorescence lifetime of $Pr^{3+}$ doped Ge-Ga-S glass from the $^1G_4$ level as compared to that for $Pr^{3+}$ doped Ga-La-S glass indicates that the germanium-containing glass is a more favorable host than the La-containing glass. Lastly, the Ge-Ga-S glass is advantageous for use as a host over $As_2S_3$ glass for two further reasons. First, it has been discovered that it is possible to dope the sulfur rich Ge-Ga-S glass with useful amounts of rare earths, on the order of a few mole % and that this is not possible to do with $As_2S_3$. Second, $As_2S_3$ shows some absorption at pump wavelengths around 1 um. In contrast, absorption in the near IR and red end of the visible spectrum is substantially reduced for the Ge-Ga-S glass host.

It is to be appreciated and understood that the specific embodiments of the invention described hereinbefore are merely illustrative of the general principles of the invention. Various modifications may be made by those skilled in the art consistent with the principles set forth hereinbefore and without departing from their teachings.

What is claimed is:

1. A laser oscillator comprised of:
   means for generating pump radiation and applying the pump radiation to a fiber;
   the fiber being comprised of a sulfur rich Ge-Ga-S host doped with an active material; and
   the fiber being disposed in a laser cavity.

2. The laser oscillator of claim 1 wherein the active material comprises rare earth ions.

3. The laser oscillator of claim 2 wherein the rare earth ions comprise $Pr^{3+}$.

4. The laser oscillator of claim 2 wherein the rare earth ions comprise $Dy^{3+}$.

5. The laser oscillator of claim 2 wherein the rare earth ions are co-doped with ions from the group of elements consisting of Yb, Nd, Ho, Er, and Tm.

6. The laser oscillator of claim 2 wherein the rare earth ions comprise $Dy^{3+}$ and the rare earth ions are co-doped with ions from the group of elements consisting of Yb, Nd, Ho, Er, Tm, Cr, and Mn.

7. The laser oscillator of claim 1 wherein the glass composition comprises at least 60 mole % sulfur.

8. The laser oscillator of claim 7 wherein the glass composition comprises less than 10 mole % gallium.

9. A superluminescent source of radiation comprised of:
   means for generating pump radiation and applying the pump radiation to a fiber;
   the fiber being comprised of a sulfur rich Ge-Ga-S host doped with an active material; and
   means for reflecting radiation produced by the active material disposed at one end of the fiber.

10. The superluminescent source of claim 9 wherein the active material comprises rare earth ions.

11. The superluminescent source of claim 10 wherein the rare earth ions comprise $Pr^{3+}$.

12. The superluminescent source of claim 10 wherein the rare earth ions comprise $Dy^{3+}$.

13. The superluminescent source of claim 10 wherein the rare earth ions are co-doped with ions from the group of elements consisting of Yb, Nd, Ho, Er, and Tm.

14. The superluminescent source of claim 10 wherein the rare earth ions comprise $Dy^{3+}$ and the rare earth ions are co-doped with ions from the group of elements consisting of Yb, Nd, Ho, Er, Tm, Cr, and Mn.

15. The superluminescent source of claim 9 wherein the glass composition comprises at least 60 mole % sulfur.

16. The superluminescent source of claim 15 wherein the glass composition comprises less than 10 mole % gallium.

17. A laser amplifier of radiation comprised of:
   means for applying the radiation and pumping radiation to a fiber;
   the fiber being comprised of a sulfur rich Ge-Ga-S host doped with an active material; and
   means, responsive to output from the fiber, for preventing back reflection into the fiber.

18. The laser amplifier of claim 17 wherein the active material comprises rare earth ions.

19. The laser amplifier of claim 17 wherein the means for applying the radiation and pumping radiation comprises a coupler.

20. The laser amplifier of claim 17 wherein the means for preventing back reflection comprises a Faraday isolator.

21. The laser amplifier of claim 17 wherein the active material is $Pr^{3+}$ and a wavelength of the amplified radiation is substantially equal to 1.3 um.

22. The laser amplifier of claim 17 wherein the active material is $Dy^{3+}$ and a wavelength of the amplified radiation is substantially equal to 1.3 um.

23. The laser amplifier of claim 17 wherein the glass composition comprises at least 60 mole % sulfur.

24. The laser amplifier of claim 23 wherein the glass composition comprises less than 10 mole % gallium.

25. A laser amplifier of radiation comprised of:
   means for applying the radiation and pumping radiation to a fiber;
   wherein the fiber is comprised of a sulfur rich Ge-Ga-S host doped with rare earth ions.

26. The laser amplifier of claim 25 wherein the rare earth ions comprise $Pr^{3+}$.

27. The laser amplifier of claim 25 wherein the rare earth ions comprise $Dy^{3+}$.

28. The laser amplifier of claim 25 wherein the rare earth ions are co-doped with ions from the group of elements consisting of Yb, Nd, Ho, Er, and Tm.

29. The laser amplifier of claim 25 wherein the rare earth ions comprise $Dy^{3+}$ and the rare earth ions are co-doped with ions from the group of elements consisting of Yb, Nd, Ho, Er, Tm, Cr, and Mn.

* * * * *